(12) United States Patent
Kimmig et al.

(10) Patent No.: US 6,305,520 B1
(45) Date of Patent: Oct. 23, 2001

(54) FRICTION CLUTCH

(75) Inventors: Karl-Ludwig Kimmig, Ottenhöfen; Michael Wachtel, Hügelsheim, both of (DE)

(73) Assignee: LuK Lamellon und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/671,594

(22) Filed: Sep. 27, 2000

Related U.S. Application Data

(63) Continuation of application No. 09/584,825, filed on May 31, 2000, now abandoned.

(30) Foreign Application Priority Data

May 31, 1999 (DE) .............................................. 199 24 954

(51) Int. Cl.[7] .................................................. F16D 13/75
(52) U.S. Cl. ..................................... 192/70.25; 192/70.27; 192/70.18; 192/89.23; 192/89.25; 192/111 A
(58) Field of Search ............................. 192/70.25, 70.27, 192/70.18, 89.23, 89.25, 111 A

(56) References Cited

U.S. PATENT DOCUMENTS

| | | |
|---|---|---|
| 5,161,660 | 11/1992 | Huber . |
| 5,409,091 | 4/1995 | Reik et al. . |
| 5,450,934 | 9/1995 | Maucher . |
| 5,628,389 | * 5/1997 | Wittmann et al. ................. 192/70.25 |
| 5,632,706 | 5/1997 | Kremmling et al. . |
| 5,715,921 | * 2/1998 | Link et al. ......................... 192/70.25 |
| 5,980,387 | 11/1999 | Friedmann et al. . |
| 6,085,882 | * 7/2000 | Kimmig et al. ................... 192/70.18 |
| 6,145,642 | * 11/2000 | Acker et al. ...................... 192/70.25 |
| 6,161,669 | * 12/2000 | Lopez ................................ 192/70.25 |

* cited by examiner

Primary Examiner—Richard M. Lorence
(74) Attorney, Agent, or Firm—Darby & Darby

(57) ABSTRACT

A friction clutch wherein a pressure plate is movable axially of and rotates with a housing which is driven by the engine of a motor vehicle. The pressure plate cooperates with a coaxial engine-driven counter-pressure plate to bear upon the respective friction linings of a clutch disc when the clutch is engaged to drive the input shaft of a transmission in the power train of the vehicle. A diaphragm spring is tiltable relative to an annular seat at the inner side of the housing and urges the pressure plate against the adjacent friction linings when the clutch is engaged. An automatic wear compensating unit serves to move the diaphragm spring and the seat axially relative to and away from the inner side of the housing to thus compensate for wear upon the friction linings. The diaphragm spring has resilient prongs which bear, directly or indirectly, upon portions of the housing to urge the diaphragm spring against the seat and to thus bias the seat toward the inner side of the housing. The pressure plate is coupled to the housing by leaf springs which tend to lift the pressure plate off the respective friction linings and to bias the pressure plate against the diaphragm spring.

39 Claims, 7 Drawing Sheets

FRICTION CLUTCH

This is a continuation, of application Ser. No. 09/584,825 filed May 31, 2000, now abandoned, which is hereby incorporated herein by reference.

BACKGROUND OF THE INVENTION

The present invention relates to friction clutches in general, and more particularly to improvements in friction clutches of the type having arrangements serving to automatically compensate for wear upon various component parts such as the friction linings of the so-called clutch disc or clutch plate.

Friction clutches with automatic wear compensating units or arrangements are disclosed or referred to, for example, in published German patent applications Serial Nos. 42 39 291, 43 06 505, 42 39 289, 43 22 677, 44 18 026, 44 31 641 and 195 10 905. Such friction clutches can be utilized with advantage in the power trains of motor vehicles, e.g., to transmit or to interrupt the transmission of torque between a prime mover (such as a combustion engine or a hybrid including an engine and a motor) and a variable-speed (manual, automated or automatic) transmission.

As a rule, a friction clutch comprises a rotary housing which is coaxial with and spaced apart from the clutch disc, a pressure plate which rotates with the housing and is movable axially between the housing and the clutch disc, and at least one clutch spring (normally a diaphragm spring) which is caused or permitted to bias the pressure plate against the adjacent friction linings of the clutch disc so that the latter is urged against a driven counterpressure plate and shares (with or without slip) the rotary movement of the housing. The housing (as well as the counterpressure plate) receives torque from the prime mover and can rotate the pressure plate as well as the diaphragm spring. The latter reacts against the housing and bears upon the pressure plate at least in the engaged condition of the clutch.

The wear compensating unit is arranged to move (when necessary) the diaphragm spring away from the housing to an extent commensurate with the extent of wear upon various component parts (particularly the friction linings) of the clutch. Furthermore, the wear compensating unit is or can be designed to ensure that the amount of energy stored by the diaphragm spring remains at least substantially constant during the useful life of the power train. In many or most instances, the wear compensating unit is installed (at least in part) between the diaphragm spring and the adjacent (inner) side of the housing. Reference may be had, for example, to commonly owned U.S. Pat. Nos. 5,409,091 (granted Apr. 25, 1995 to Reik et al. for "AUTOMATICALLY ADJUSTABLE FRICTION CLUTCH") and 5,450,934 (granted Sep. 19, 1995 to Maucher for "FRICTION CLUTCH").

The disclosures of all U.S. and foreign patents and patent applications identified in the specification of the present application are incorporated herein by reference. The disclosure of the German priority application Serial No. 199 24 954.7 (filed May 31, 1999) is also incorporated herein by reference.

OBJECTS OF THE INVENTION

An object of the instant invention is to provide a friction clutch which embodies an automatic wear compensating unit and is simpler and less expensive than but at least as reliable as heretofore known friction clutches of such character.

Another object of the invention is to provide a friction clutch which embodies a wear compensating unit comprising fewer parts than the wear compensating units of heretofore known friction clutches.

A further object of the present invention is to provide novel and improved component parts for use in the above outlined friction clutch.

An additional object of the invention is to provide a novel and improved clutch spring for use in the above outlined friction clutch.

Still another object of the invention is to provide a novel and improved method of assembling the parts of the above outlined friction clutch.

A further object of the invention is to provide a novel housing for use in the above outlined friction clutch.

Another object of the invention is to provide a novel and improved combination of clutch spring and housing for use in the above outlined friction clutch.

An additional object of the invention is to provide a friction clutch which comprises a small number of simple, compact, relatively inexpensive and readily combinable parts which do not adversely affect its utility and/or versatility and/or the duration of its useful life.

Still another object of the invention is to provide a friction clutch the operation of which necessitates the exertion of smaller forces than that of conventional friction clutches.

A further object of the invention is to provide a friction clutch which can be engaged and/or disengaged in response to the exertion of a relatively small force and in such a way that the fluctuations of required force are small or negligible.

Another object of the invention is to provide a friction clutch which is constructed and assembled in such a way that the magnitude of the required engaging and/or disengaging force is not influenced by the extent of wear upon the friction linings, pressure plate and other parts of the clutch.

An additional object of the invention is to provide a friction clutch which is constructed and assembled in such a way that the magnitude of the clutch disengaging force need not vary, or need not vary to an appreciable extent, during disengagement as well as and especially subsequent to disengagement of the friction linings of the clutch disc from the neighboring parts.

Still another object of the invention is to provide a power train, particularly for use in motor vehicles, which embodies a friction clutch of the above outlined character.

A further object of the invention is to provide a friction clutch which can be installed in existing power trains as a superior substitute for presently known friction clutches having automatic wear compensating means.

SUMMARY OF THE INVENTION

The invention is embodied in a repeatedly engageable and disengageable friction clutch which comprises a housing rotatable about a predetermined axis, a rotary clutch disc which is coaxial with and is spaced apart from the housing and is subject to progressing wear in response to repeated engagement of the clutch, a pressure plate which is coaxial with and is disposed between the clutch disc and the housing and is rotatable with and movable within limits axially of the housing, at least one diaphragm spring which is disposed between the pressure plate and the housing and is arranged to bias the pressure plate against the clutch disc in the engaged condition of the clutch, and means for automatically compensating for wear at least upon the clutch disc. The wear compensating means includes a seat which pivotably mounts the at least one diaphragm spring and means (such as complementary first and second sets of ramps respectively provided on the housing and on the seat as well as means for biasing one of such sets of ramps to turn relative to the other set of ramps and to thus move the seat axially and away from the housing) for intermittently moving the at least one diaphragm spring axially of and away from the housing toward the clutch disc. The at least one diaphragm spring comprises resilient means reacting against a portion of the housing (e.g., against the heads of an annular array of rivets anchored in the housing) and serving to urge the at least one diaphragm spring against the seat.

The clutch further comprises means for rotating the housing and/or the pressure plate, and such means for rotating can form part of a power train in a motor vehicle. For example, the means for rotating can constitute the output element of an internal combustion engine or a device (e.g., a flywheel) which receives torque from the engine.

The housing is rotated in response to rotation of the pressure plate or vice versa, e.g., by way of leaf springs which are affixed to the housing and to the pressure plate and extend circumferentially of the pressure plate.

The at least one diaphragm spring is arranged to store energy at least in the engaged condition of the clutch, and the aforementioned means for intermittently moving the at least one diaphragm spring axially of and away from the housing to thus compensate for wear upon the clutch disc can include means for maintaining the amount of energy stored by the at least one diaphragm spring in the engaged condition of the clutch at an at least substantially constant value.

The at least one diaphragm spring can be designed in such a way that it includes a main portion (e.g., a circumferentially complete annular portion constituting the radially outermost part of the at least one diaphragm spring), and the aforementioned resilient means of the at least one diaphragm spring can comprise a plurality of prongs which are of one piece with the annular main portion. The aforementioned portion of the housing can include retainers (such as rivets) which are engaged by the prongs; the at least one diaphragm spring is or can in be installed in such a way that one of its sides confronts the pressure plate and the retainers of or on the housing.

The housing can be designed in such a way that it further includes a cover for the aforementioned seat of the wear compensating means; the aforementioned portion of such housing can include a plurality of distancing elements (such as bolts, rivets or the like) which are affixed to the cover. The at least one diaphragm spring can be provided with openings or windows through which the distancing elements of the housing extend from the cover toward the pressure plate. If the distancing elements are rivets, they can be provided with heads each of which is engaged by at least one prong of the at least one diaphragm spring. The openings of the at least one diaphragm spring are disposed between the cover of the housing and the respective rivet heads, as seen in the direction of the common axis of the housing and the pressure plate.

The rivets can be omitted if at least the cover of the housing is made of a resilient material (e.g., sheet steel). Such cover can be provided with a plurality of resilient arms, and the prongs of the resilient means forming part of the at least one diaphragm spring can bear (directly or indirectly) upon the arms of the cover. The arms of the cover can extend through windows or analogous openings provided in the at least one diaphragm spring; each such arm can extend from the cover, through a window of the at least one diaphragm spring, and toward the pressure plate.

The resilient means of the at least one diaphragm spring can be set up to oppose the disengagement of the clutch; for example, the disengaging means can comprise a release bearing or an analogous device which can tilt the at least one diaphragm spring relative to the seat and relative to the pressure plate.

The at least one diaphragm spring can be constructed, configured and mounted in such a way that its characteristic curve is a degressive curve, at least during at least one selected stage of operation of the clutch.

The at least one diaphragm spring can be configured in such a way that the prongs of its resilient means form part of and are surrounded by the aforementioned annular main portion. The latter is resilient, and the prongs can extend from such main portion toward and at least substantially radially of the common axis of the housing and the pressure plate. In accordance with one presently preferred embodiment, at least one of the prongs includes a first portion (such as an elongated arm or leg) extending from the annular portion toward the predetermined axis, a second portion (such as an elongated arm or leg) extending in a direction from the predetermined axis toward the annular portion, and an intermediate portion (e.g., an arcuate web) which is remote from the annular portion and connects the first portion with the second portion.

The resilient means of the at least one diaphragm spring can comprise one, two or more at least substantially hairpin-shaped resilient elements or prongs.

The at least one diaphragm spring can form part of the means for disengaging the clutch, i.e., of means for effecting axial movements of the pressure plate away from the clutch disc. The at least one diaphragm spring of such friction clutch can be designed to comprise the aforementioned annular main portion which bears upon the pressure plate at least in the engaged condition of the friction clutch, resilient means in the form of or including prongs which extend from the annular portion toward the predetermined axis, and tongues each of which extends from the annular portion toward the predetermined axis and at least one of which is flanked by a pair of prongs. The tongues form part of the clutch disengaging means.

The at least one diaphragm spring can constitute a converted circular or polygonal blank which has been subjected to a cutting or other suitable material removing treatment to be provided with the aforementioned annular main portion, with the aforementioned prongs and preferably also with the aforementioned tongues. The prongs and/or the tongues are or can be surrounded, at least in part, by slots but preferably by cutouts provided in the blank. Such cutouts can include the aforementioned windows or analogous openings as well as a central opening of the at least one diaphragm spring.

The at least one diaphragm spring can be configured and mounted in the friction clutch in such a way that its prongs are prestressed and thus bear upon the aforementioned portion of the housing while the annular portion bears upon the pressure plate. The prongs are resiliently deformable at least in the direction of the predetermined axis.

The improved friction clutch preferably further comprises elastically deformable lifting members (such lifting members can include or be constituted by the aforediscussed leaf springs) which are arranged to bias the pressure plate axially toward the housing with a variable force during disengagement of the clutch. Such lifting members are riveted and/or otherwise attached or affixed to the pressure plate and to the housing. It is preferred to configure, dimension and install the lifting members in such a way that they subject the pressure plate to the action of a force which varies in response to progressing wear upon the clutch disc and attendant movements of the pressure plate axially of and away from the housing during successive disengagements of the clutch. It is often preferred to select lifting members having a force applying characteristic which is degressive in response to the aforementioned movements further away from the housing.

The improved friction clutch preferably further comprises a driven (e.g., engine-driven) rotary counterpressure plate which is coaxial with and shares the rotary movements of the pressure plate. The clutch disc is disposed between the pressure plate and the counterpressure plate. The counterpressure plate can constitute or it can form part of a one-piece or composite flywheel.

As mentioned hereinbefore, the lifting members can include or constitute leaf springs which serve to yieldably bias the pressure plate axially and away from the clutch disc. The leaf springs can be configured and/or installed in such a way that they assume undulate shapes and store energy in the direction of the predetermined axis. At least one first portion of each such leaf spring can be affixed (such as riveted) to the pressure plate, and at least one second portion of each such leaf spring can be affixed (such as riveted) to the housing. These leaf springs are or can be elongated and can also be stressed lengthwise, at least in the engaged condition of the friction clutch. For example, the leaf springs can be bent (as seen lengthwise of such leaf springs) to be thus maintained in stressed condition, at least in the engaged condition of the clutch.

The pressure plate is or can be installed to cover a predetermined distance in the direction of the predetermined axis and away from the clutch disc during each disengagement of the clutch, and such clutch can further include resilient lifting members which serve to bias the pressure plate toward the housing with a gradually (progressively) varying force at least during a portion of each compensation for wear upon the clutch disc. Such lifting members can include or consist of the aforediscussed leaf springs and they can move the pressure plate toward the housing during each disengagement of the clutch in parallel with the aforediscussed resilient means (such as prongs) of the at least one diaphragm spring. The leaf springs can be configurated and mounted to urge the pressure plate away from the clutch disc with a force which decreases in the course of each disengagement of the clutch. The means for affixing the leaf springs to the pressure plate and to the housing can include rivets or other suitable fasteners. The leaf springs can be in torque transmitting engagement with the pressure plate and with the housing, particularly to rotate the pressure plate in response to rotation of the housing.

The leaf springs and the resilient means of the at least one diaphragm spring can be arranged to subject the pressure plate to the action of a predetermined resultant force which acts in the direction away from the clutch disc at least substantially independently of the extent of wear upon the clutch disc. The predetermined force can be at least substantially constant or such force can increase in response to progressing wear upon the clutch disc.

The novel features which are considered as characteristic of the invention are set forth in particular in the appended claims. The improved friction clutch itself, however, both as to its construction and the modes of constructing, assembling and operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
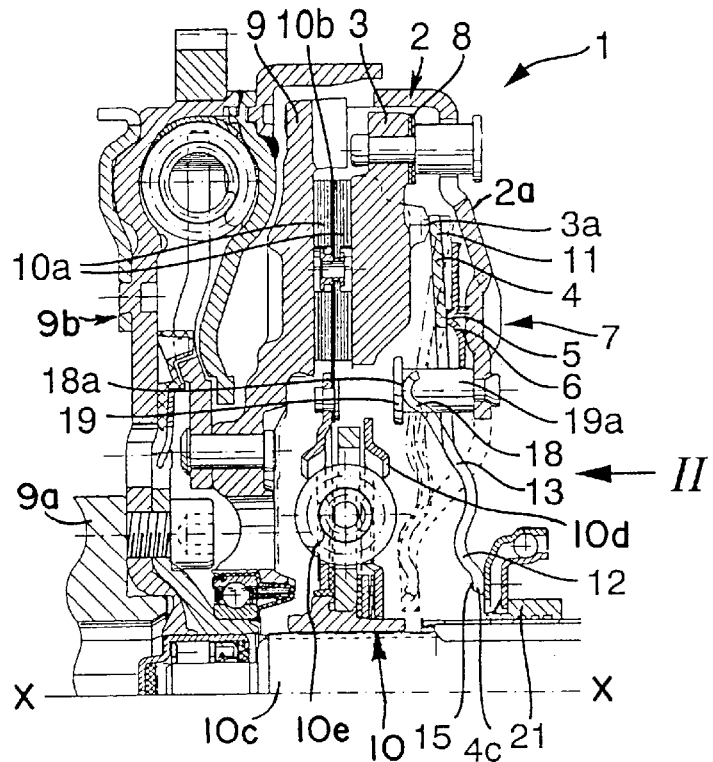
FIG. 1 is a fragmentary axial sectional view of a friction clutch which embodies one form of the invention and of certain other constituents of a power train for use in a motor vehicle.
Figure 2:
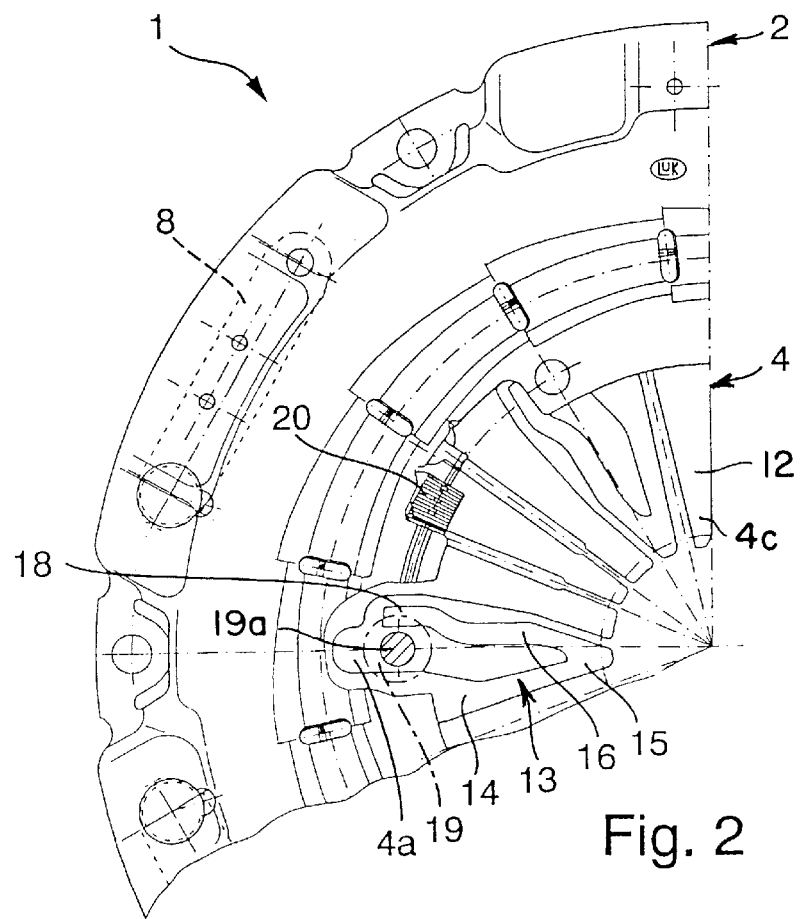
FIG. 2 is a fragmentary elevational view of the friction clutch as seen in the direction of arrow II shown in FIG. 1.

FIGS. 1 and 2 illustrate a portion of a power train including a friction clutch 1 which is constructed and assembled and is arranged to operate in accordance with one embodiment of the present invention. The clutch 1 comprises a cupped housing 2 having an end wall or cover 2a (hereinafter called cover) and being rotatable about an axis X—X. The housing 2 transmits torque to a pressure plate 3 which has limited freedom of movement in the direction of the axis X—X toward and away from the cover 2a. The means for biasing the pressure plate 3 axially and away from the cover 2a to thus engage the friction clutch 1 includes at least one clutch spring. In the embodiment of FIGS. 1 and 2, the clutch 1 comprises a single clutch spring, namely a diaphragm spring 4 of the type best shown in FIG. 3.

When properly installed in the housing 2, the diaphragm spring 4 acts not unlike a two-armed lever in that it is fulcrumed on an annular seat 5 provided therefor at the inner side of the cover 2a. The spring 4 includes a circumferentially complete annular main portion 11 which abuts an annulus of discrete projections 3a (or a single ring-shaped projection) at the confronting side of the pressure plate 3. The annular main portion 11 constitutes the radially outermost portion of the spring 4, and the latter further comprises an annular array of prongs or tongues 12 (hereinafter called tongues) which extend at least substantially radially inwardly toward but short of the axis X—X. The tongues 12 are of one piece with the radially innermost part of the annular main portion 11 and serve as a part of the means for disengaging the friction clutch 1, namely for enabling and/or causing the pressure plate 3 to move axially of the housing 2 and away from the respective set of friction linings 10a at one side of a clutch plate or clutch disc 10 which is coaxial with the housing 2 and carries a second set of friction linings 10a confronting the friction surface of a counterpressure plate 9 driven by the output element of a torsional vibration damper 9b mounted on the rotary output element 9a (e.g., a camshaft or a crankshaft) of a prime mover such as the combustion engine in the power train of a motor vehicle.

As concerns the manner in which the damper 9b transmits torque to the counterpressure plate 9 and in which the clutch disc 10 can transmit torque to the input shaft 10c of a transmission, reference may be had, for example, to commonly owned U.S. Pat. No. 5,980,387 granted Nov. 9, 1999 to Friedmann et al. for "APPARATUS FOR DAMPING VIBRATIONS". The operation of the damper 10e between the hub of the clutch disc 10 and the carrier 10d of friction linings 10a is fully described, for example, in commonly owned U.S. Pat. No. 5,161,660 granted Nov. 10, 1992 to Huber for "CLUTCH PLATE WITH PLURAL DAMPERS".

The means for transmitting torque from the housing 2 to the pressure plate 3 comprises a set of leaf springs 8 which extend substantially tangentially (i.e., generally circumferentially) of the pressure plate and further serve to draw the pressure plate axially and away from the adjacent set of friction linings 10a (i.e., to actually disengage the friction clutch 1 or to enable the plates 3, 9 to slip relative to the clutch disc 10) when permitted to do so by the diaphragm spring 4.

The axial position of the pressure plate 3 relative to the housing 2 is selected in such a way that the diaphragm spring 4 is caused to store energy and thus urges the friction surface of the pressure plate against the adjacent set of friction linings 10a. As can be seen in FIG. 1, the pressure plate 3 is surrounded by the marginal portion of the housing 2 and its axial position relative to the cover 2a of the housing is such that the annular main portion 11 of the diaphragm spring bears upon the projections 3a and the main portion 11 also bears upon the seat 5 at a location radially inwardly of the projections 3a. In other words, the diaphragm spring 4 exhibits a tendency to increase the conicity of its main portion 11 and thus bears upon the projections 3a.

The seat 5 includes or consists of a washer-like sheet metal part 6 which is located at the inner side of the cover 2a. The part 6 is a constituent of an automatic wear compensating assembly or unit 7 which is designed to compensate for wear upon the friction linings 10a, preferably during the entire useful life of the friction clutch 1 and the power train embodying the clutch. The unit 7 can also compensate for wear upon certain additional parts of the friction clutch 1, e.g., upon those (friction) surfaces of the plates 3 and 9 which come into frictional engagement with the adjacent sets of friction linings 10a during each engagement of the clutch including full engagement (when the RPM of the clutch disc 10 matches that of the plates 3, 9) as well as partial engagement (when the clutch disc is compelled to rotate but slips relative to the plates 3 and 9). Each automatic compensation for wear involves a certain displacement of the diaphragm spring 4 axially of and away from the cover 2a, i.e., toward the pressure plate 3.

In accordance with a feature of the invention, the diaphragm spring 4 further comprises a set of tongues or prongs 13 (hereinafter called prongs to distinguish from the tongues 12) which extend radially inwardly from and are of one piece with the main portion 11 and which alternate with the tongues 12 as seen in the circumferential direction of the main portion 11 (reference should be had to FIG. 3). The prongs 13 are configured and the diaphragm spring 4 is mounted in the clutch 1 in such a way that the prongs indirectly bear upon the housing 2 in a sense to urge the main section 11 of the diaphragm spring against the sheet metal part 6 of the seat 5.

Figure 3:
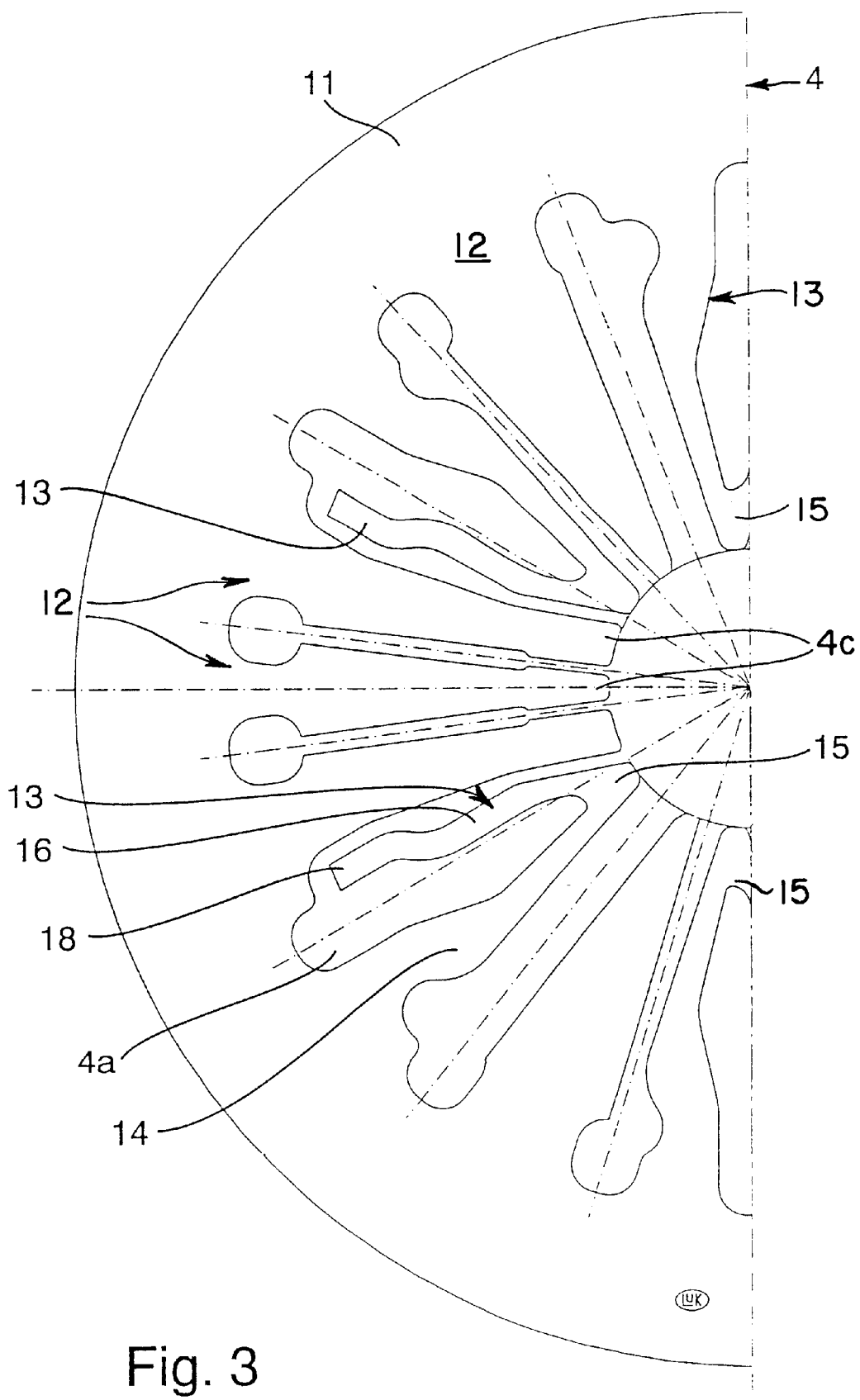
FIG. 3 is an enlarged fragmentary elevational view of the diaphragm spring which is utilized in the friction clutch of FIGS. 1 and 2.

The prongs 13 of the diaphragm spring 4 which is shown in FIG. 3 are identical or substantially identical (the identity is desirable for the convenience of making but is not critical) and each thereof resembles an elongated hairpin. Thus, each such prong has a substantially radially inwardly extending first section or leg 14 which is of one piece with the radially innermost part of the annular main portion 11, a substantially radially outwardly extending leg 16 which ends short of the main portion 11, and a U- or V-shaped intermediate portion or junction or web 15 which connects the radially innermost portions of the legs 14, 16 and can further serve as a part of the means for disengaging the friction clutch 1.

The distance between the web 15 of any one of the prongs 13 and the annulus of projections 3a (as measured radially) of the diaphragm spring 4) is rather pronounced, i.e., the prongs 13 can undergo a pronounced flexing in the direction of the axis X—X. The free ends or tips 18 of the radially outwardly extending legs 16 bear upon retainers 19 which are carried by the cover 2a and which can be said to form part of the housing 2. In the clutch 1 of FIGS. 1 to 5, the retainers 19 are upset heads of axially parallel rivets 19a which are anchored in the cover 2a, and each free end 18 bears against that (inner) side of the respective retainer or head 19 which confronts the inner side of the cover. In other words, the diaphragm spring 4 is installed in the housing 2 in prestressed condition and causes its main portion 11 to bear upon the sheet metal part 6 of the seat 5.

It is also within the purview of the present invention to replace the separately produced rivets 19a with arms or lugs (not specifically shown) which are of one piece with the cover 2a and are bent or otherwise shaped in such a way that they include portions corresponding to the retainers 19, i.e., portions which are capable of serving as abutments for and as a means for stressing the diaphragm spring 4 in a direction to urge the annular main portion 11 against the part 6 of the seat 5.

The shanks of the rivets 19a extend from the cover 2a, through openings or windows or passages 4a provided in the diaphragm spring 4, and toward the pressure plate 3 and clutch disc 10. The retainers or heads 19 are provided on those end portions of the respective rivets 19a which are remote from the cover 2a and are located between the diaphragm spring and the clutch disc 10.

In the embodiment of FIGS. 1 to 5, the webs 15 of the prongs 13 are located at the same distance from the axis X—X as the free radially inner ends or tips 4c of the tongues 12. Thus, when the clutch 1 is being disengaged by a release bearing 21 shown in FIG. 1, the webs 15 cooperate with the radially inner ends or tips 4c to tilt the diaphragm spring 4 at the fulcrum defined by the part 6 of the seat 5 so that the main portion 11 permits the leaf springs 8 to retract the pressure plate 3 away from the counterpressure plate 9 and to thus permit for full or partial disengagement of the friction clutch 1.

In order to reduce friction, the free ends 18 of the arms 16 forming part of the prongs 13 are provided with convex surfaces 18a which contact the adjacent sides of the respective retainers 19. As already mentioned hereinabove, the diaphragm spring 4 is mounted in a pre-stressed condition, i.e., its tongues 12 and its prongs 13 store energy and the annular main portion 11 bears upon the projections 3a of the pressure plate 3 as well as upon the part 6 of the seat 5. Thus, the diaphragm spring 4 biases the seat 5 at least in the engaged condition of the clutch 1.

The seat 5 is movable relative to the cover 2a of the housing 2 by other parts of the automatic wear compensating unit 7. The latter ensures that the spring 4 is invariably mounted on the part 6 at the inner side of the cover 2a without play, not only prior but also subsequent to each axial adjustment of the diaphragm spring 4 in a direction toward the pressure plate 3 to thus compensate for wear upon certain parts of the clutch 1, primarily upon the friction linings 10a. The main portion 11 of the diaphragm spring 4 abuts directly against and is tiltable relative to the part 6 of the seat 5. The part 6 has a first set of ramps which abut the neighboring ramps of a set of complementary ramps at the inner side of the cover 2a.

The automatic wear compensating unit 7 further comprises one or more coil springs 20 (one such spring is shown in FIG. 2) which tend to turn the part 6 of the seat 5 relative to the cover 2a whereby the ramps of the part 6 slide along the adjoining ramps of the set of ramps at the inner side of the cover, and this causes the diaphragm spring 4 to move axially toward the counterpressure plate 9. The ramps can be separately produced parts which are secured to the seat 5 and to the cover 2a, or each set of such ramps can be of one piece with the part 6 and with the cover 2a, respectively. Reference may be had to the aforementioned published German patent application Serial No. 43 22 677 as well as to published German patent applications Serial Nos. 195 24 827 and 198 55 583. Still further, reference may be had again to the aforementioned U.S. Pat. No. 5,450,934 which fully describes and shows several wear compensating units each of which employs two sets of abutting ramps and coil springs which serve to turn one set of ramps relative to the other set and to thus move the diaphragm spring axially to an extent which is necessary to compensate for certain amount of wear at least upon the friction linings of the clutch disc.

Each coil spring 20 reacts against the cover 2a and bears upon the part 6 to turn such part in a sense to move the diaphragm spring 4 axially toward the counterpressure plate 9.

The clutch disc 10 further comprises resilient spreading members 10b (e.g., in the form of pads) which are installed between the two sets of friction linings 10a and tend to move such sets of friction linings axially of the clutch disc 10 and away from each other. The extent to which the resilient pads 10b can move the two sets of friction linings axially of the clutch disc 10 and away from each other can be in the range of between about 0.3 and 0.8 mm. The purpose of the resilient pads 10b is to permit for gradual transmission of torque from the plates 3, 9 to the clutch disc 10 during engagement of the friction clutch 1. The first stage of such engagement involves axial movement of the pressure plate 3 toward the pressure plate 9 to an extent which is necessary to establish frictional contact between the friction surfaces of the plates 3, 9 and the respective sets of friction linings 10a. The next stage of engagement of the clutch 1 involves compression of the resilient pads 10b while the pressure plate 3 continues to move toward the counterpressure plate 9, i.e., while the friction linings 10a which are adjacent to and engaged by the pressure plate 3 are caused to advance the resilient pads 10b toward the other set of friction linings 10a and toward the counterpressure plate 9. Such gradual engagement of the clutch 1 is desirable and advantageous in many instances.

However, it is also possible to provide the clutch disc 10 with two sets of friction linings 10a which are held against axial movement toward each other. In other words, the two sets of friction linings can be bonded or otherwise secured to the carrier 10d of such friction linings without the interposition of the yieldable pads 10b or the like.

Figure 14:
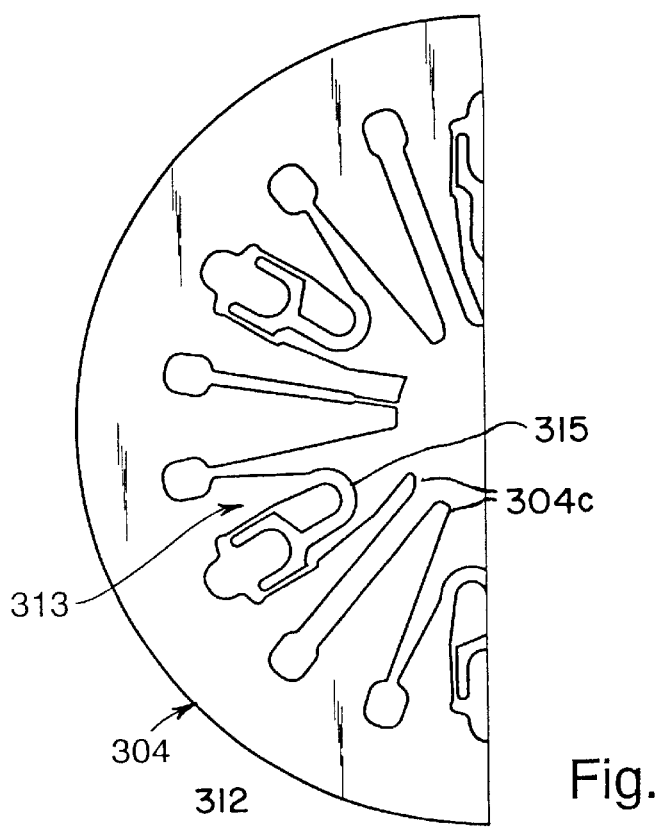
FIG. 14 is a view similar to that of FIG. 13 but showing a portion of still another diaphragm spring.

The number of prongs 13 on the diaphragm spring 4 can vary, e.g., between three and nine. The diaphragm spring 4 is designed to have six prongs 13. The webs 15 of the prongs 13 and the free ends 4c of the tongues 12 can be engaged and displaced axially of the clutch 1 by the release bearing 21 which surrounds and is signable along the input shaft 10c of the transmission. It is possible to reduce the lengths of the prongs 13 (as seen in the radial direction of the diaphragm spring 4) so that their webs 15 are located radially outwardly of the path of the release bearing 21 or other suitable means for tilting the diaphragm spring relative to the seat 5. Such modified diaphragm spring is shown in FIG. 14.

Alternatively, it is possible to move the webs 15 axially toward the clutch disc 10 so that they are out of reach of the release bearing 21.

In order to reduce the likelihood of changes of length, it is advisable to avoid radiation treatment of the tongues 12 and/or prongs 13, especially of the prongs. Furthermore, it is often desirable to reduce the likelihood of longitudinal changes of the tongues 12 and of the prongs 13 (especially of the prongs) by ensuring that the hardness of the radially innermost portions of these parts (i.e., of the free ends 4c of the tongues 12 and of the webs 15 of the prongs 13) does not exceed the hardness of the major portions of such parts (such as the arms 14, 16 of the prongs 13). However, it might be desirable (under certain circumstances) to increase the hardness of the free end portions 18 above the hardness of the other portions 14, 15, 16 of the prongs 13.

It is further within the purview of the present invention to prolong the stability and hence the useful life of the prongs 13 by stamping or embossing at least the marginal zones of the webs 15 because such treatment results in an optimizing of the progress of tension in the respective portions of the prongs. Moreover, such stamping or embossing treatment can entail a reduction or elimination of tension peaks.

Figure 4:
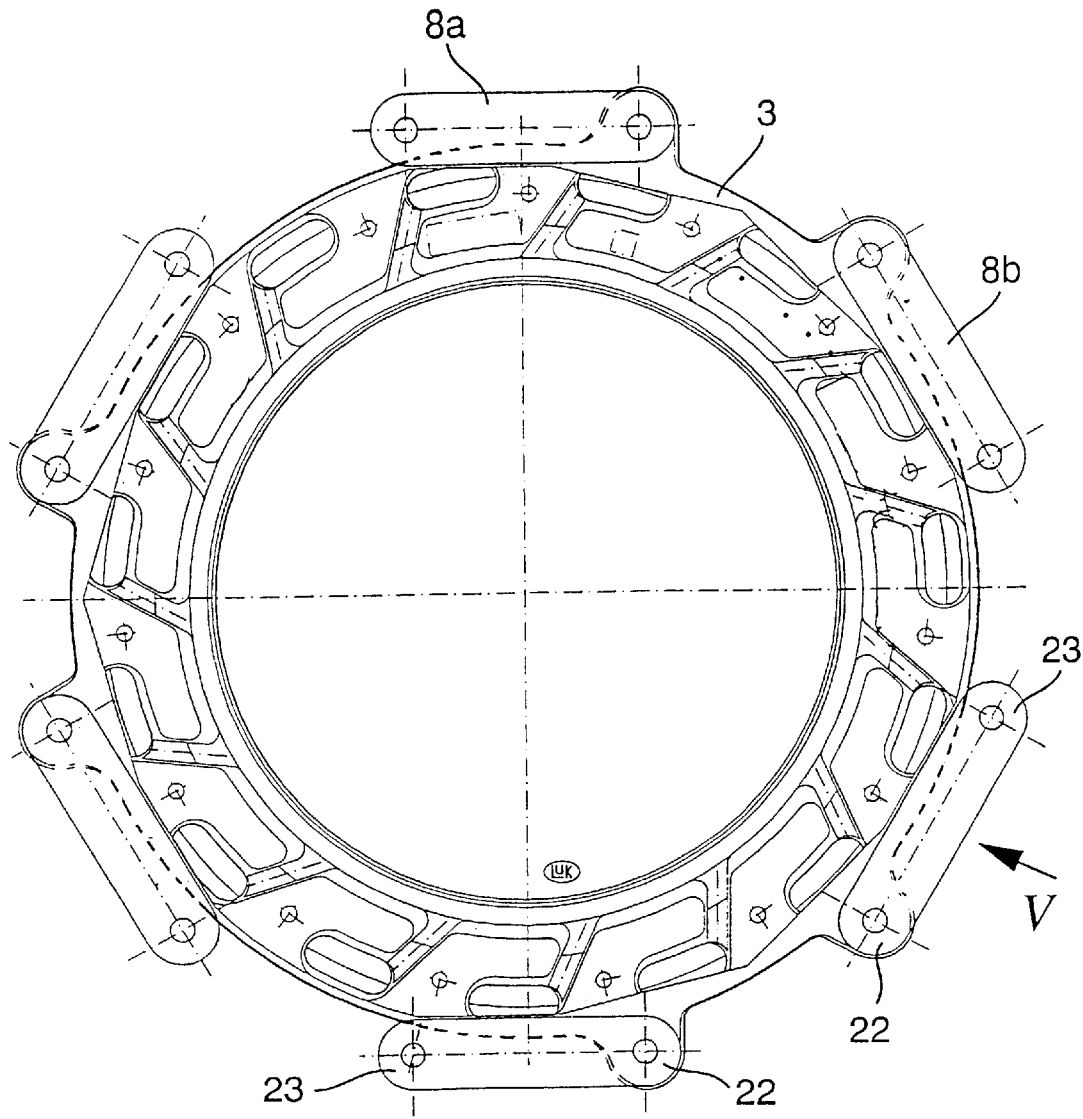
FIG. 4 is an elevational view of the pressure plate and certain other constituents of the friction clutch which is shown in FIGS. 1 and 2.

FIG. 4 shows one mode of selecting the configuration of the elongated leaf springs and of installing such leaf springs to axially movably but non-rotatably couple the pressure plate 3 to the housing 2. The leaf springs which are shown in FIG. 4 include two sets, namely a set of springs 8a and a set of springs 8b. Each of these leaf springs includes a first end portion riveted or otherwise affixed to the marginal portion of the pressure plate 3 and a second end portion suitably affixed to the marginal portion of the housing 2.

The leaf springs 8a alternate with the leaf springs 8b as seen in the circumferential direction of the pressure plate 3.

Furthermore, that end portion of a leaf spring 8a which is riveted or otherwise affixed to the pressure plate 3 is adjacent that end portion of the neighboring leaf spring 8b which is riveted or otherwise affixed to the housing 2. Analogously, that end portion of a leaf spring 8a which is affixed to the pressure plate 3 is adjacent or immediately adjacent that end portion of the neighboring leaf spring 8b which is affixed to the housing 2. Such distribution and mounting of the leaf springs 8a and 8b ensure that one set is effective in the direction of pull while the other set is effective in the coasting direction. Thus, if the leaf springs 8a are subjected to tensional stresses, the leaf springs 8b are subject to (i.e., they are called upon to withstand) buckling stresses or vice versa.

Figure 5:
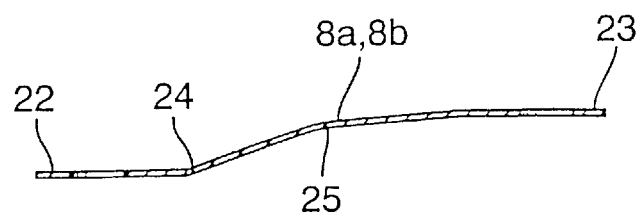
FIG. 5 is an enlarged side elevational view of one of the leaf springs forming part of the friction clutch, the view being taken in the direction of arrow V shown in FIG. 4.

The two sets of leaf springs 8a, 8b are installed in the clutch 1 in such a way that they are stressed at least while the clutch is disengaged, namely these leaf springs tend to move the pressure plate 3 axially and away from the clutch disc 10 (i.e., toward the cover 2a of the housing 2). This can be readily accomplished by imparting to each of the leaf springs 8a, 8b a shape as shown in FIG. 5. Thus, that end portion (such as 22) which is affixed to the housing 2 tends to move into a plane which is or can be parallel to the plane of the other end portion (such as 23), namely the end portion which is affixed to the pressure plate 3.

Each of the illustrated discrete leaf springs 8a and/or 8b can be assembled of a package or stack of two or more superimposed leaf springs. Moreover, the distribution, configuration and mounting of the two sets of leaf springs 8a and 8b are preferably such that, when the clutch 1 is assembled, the leaf springs are subjected to longitudinal tensional stresses; this ensures that the leaf springs urge the pressure plate 3 axially toward the cover 2a of the housing 2 as well as that the forces exerted by the leaf springs upon the pressure plate (in a sense to move the pressure plate toward the cover 2a of the axially fixed housing 2) increase at least while the distance of the pressure plate from the cover 2a is on the increase. At the very least, such situation should exist during one or more stages of axial movement of the pressure plate 3 relative to the housing 2.

To summarize: It is normally preferred that the leaf springs 8a, 8b should store energy or additional energy while the major portion 11 of the diaphragm spring 4 is in the process of moving the projections 3a of the pressure plate 3 axially of and away from the cover 2a of the housing 2.

When the clutch 1 is engaged, the leaf springs 8a, 8b are deformed as seen in the direction of the axis X—X and are also upset as seen in the longitudinal direction of such springs. The upsetting entails an axial arching of the leaf springs. By properly selecting the distances between the loci of riveting of the leaf springs 8a, 8b to the pressure plate 3 and to the housing 2, one can determine in advance and/or influence the internal stressing as well as the configuration (deformation) of the leaf springs. It is presently preferred to ensure that, when the leaf springs 8a, 8b are properly installed, they are stressed in the direction of the axis X—X as well as in the circumferential direction of the parts 2, 3 (i.e., lengthwise of the leaf springs).

In order to achieve a predetermined optimal arching of the leaf springs 8a and 8b, it is often desirable to provide such springs with more or less pronounced transverse bends. FIG. 5 shows two longitudinally spaced apart parallel or substantially parallel bends or steps or edges 24, 25. The step 24 is rather close to the end portion 22 but the step 25 is nearer to the step 24 than to the end portion 23. The leaf springs 8a, 8b can be made of a relatively thin metallic sheet material, e.g., of spring steel having a thickness in the range of between about 0.2 and 0.8 mm.

Figure 6:
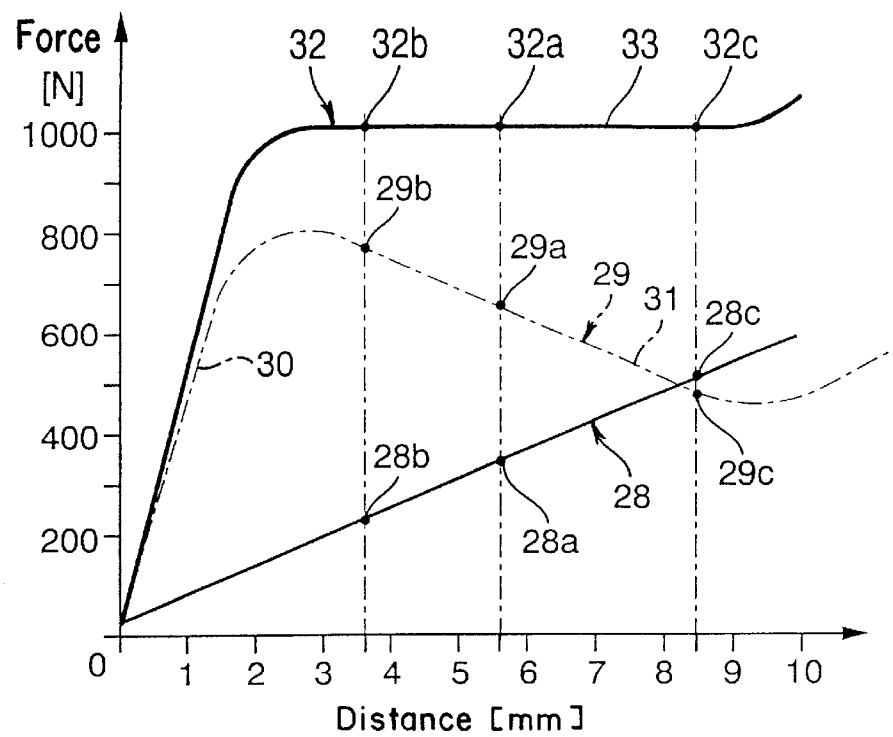
FIG. 6 shows a coordinate system with curves showing the relationships between the forces generated and the distances covered by the leaf springs and by certain parts of the diaphragm spring during various stages of operation of the friction cutch.

The curves in the coordinate system of FIG. 6 denote the relationships between the forces (in Newtons) exerted and distances (in mm) covered by the prongs 13 of the diaphragm spring 4 and by the leaf springs 8a, 8b. The curve 28 pertains to the prongs 13, the curve 29 pertains to the leaf springs 8a, 8b, and the curve 32 is a resultant curve characteristic of the curves 28 and 29. The distances are measured along the abscissa, and the forces are measured along the ordinate.

The curve 28 is characteristic of the prongs 13 of the diaphragm spring 4 which is utilized in the friction clutch 1. As indicated by this curve, the prongs 13 generate a proportionally increasing force, i.e., the curve 28 is a straight line having an unchanging upward slope. However, the configuration and/or certain other characteristics of the prongs 13 can be altered to provide a characteristic curve replacing the curve 28 and having a progress departing, at least in part, from a straight line. For example, at least one portion of the characteristic curve replacing the curve 28 can have an arcuate shape.

The curve 29 is characteristic of the leaf springs 8a, 8b of the type described with reference to and shown in FIGS. 4 and 5. As shown, when the leaf springs 8a, 8b begin to store energy, the amount of stored energy increases linearly (as indicated by the at least substantially straight upwardly sloping section or part 30 of the curve 29). The rate at which the leaf springs thereupon store (additional) energy decreases gradually as indicated by the straight downwardly sloping section 31 of the curve 29. The section 31 need not constitute a straight line. Furthermore, the steepness of the downward slope of the section 31 can be altered, either gradually or abruptly (e.g., stepwise). For example, not only the section 30 but also the section 31 can include one or more arcuate portions or can constitute (in its entirety) an arcuate section of the curve 29. As mentioned above, such changes can be arrived at by appropriate alterations of the shapes, dimensions and/or other characteristics of the leaf springs 8a and 8b.

The relationships between the characteristics of the leaf springs 8a, 8b and the prongs 13 can be selected in such a way that the resultant (32) of the curves 28, 29 includes a straight horizontal section or stretch 33 denoting that, during the corresponding stage of operation of the friction clutch 1, the leaf springs 8a, 8b and the prongs 13 jointly subject the diaphragm spring 4 to the action of a composite force which is at least substantially constant. This ensures that the operating point of the fully engaged clutch 1 is at least substantially constant. Consequently, the operating range as well as the slope (conicity) of the diaphragm spring 4, too, are at least substantially constant.

If the clutch 1 is to be disengaged, the release bearing 21 is moved in a direction to the left, as viewed in FIG. 1 (i.e., as indicated by the arrow II), and engages and shifts axially the free ends or tips 4c of the tongues 12. The diaphragm spring 4 then acts as a two-armed lever in that the radially inner part of its main portion 11 pivots relative to the annular seat 5 and the radially outer part of the main portion 11 moves axially and away from the counterpressure plate 9. This enables the leaf springs 8a, 8b to move the pressure plate 3 axially toward the cover 2a of the housing 2.

The friction surface of the pressure plate 3 becomes disengaged from the adjacent set of friction linings 10a when the diaphragm spring 4 completes a tilting movement through a predetermined angle, i.e., when the pressure plate 3 has covered a predetermined distance (in mm) in a direction away from the axially fixed counterpressure plate 9.

The resilient pads 10b expand and push the two sets of friction linings 10a apart during the aforediscussed first stage of disengagement of the clutch 1. Once the pressure plate 3 has moved away from actual contact with the adjacent set of friction linings 10a, the resilient pads 10b no longer urge the pressure plate against the diaphragm spring 4, i.e., such function is thereupon performed solely by the leaf springs 8a and 8b which cause the projections 3a to abut the adjacent side of the major portion 11 of the diaphragm spring.

Figure 7:
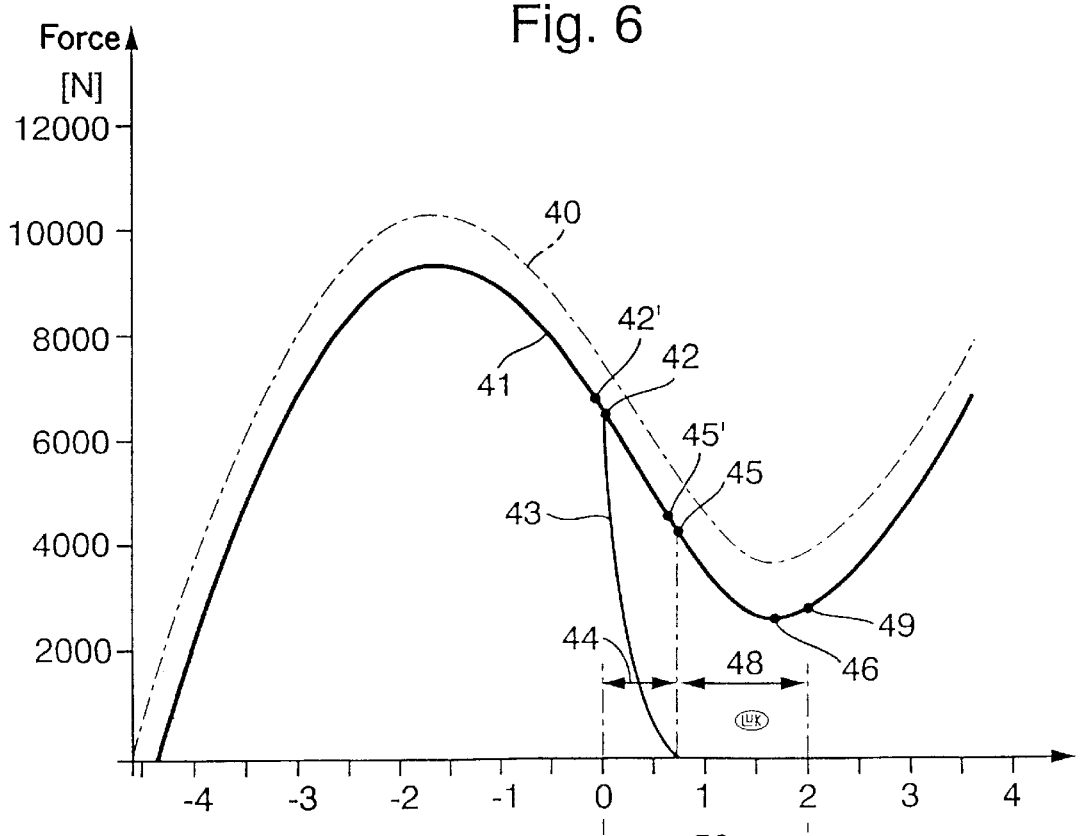
FIG. 7 shows a coordinate system wherein the curves represent the relationships between the forces furnished by the diaphragm spring and the distances covered by the pressure plate of the friction clutch.

In the coordinate system of FIG. 7, the curve 40 denotes the progress of the force which is furnished by the diaphragm spring 4 while this spring undergoes deformation in the region between the projections 3a of the pressure plate 3 and the annular seat 5. The curve 41 of FIG. 7 is characteristic of the progress of force which must be applied to the pressure plate 3 (in a direction counter to that indicated in FIG. 1 by the arrow II) in order to change the conicity of the diaphragm spring. The difference between the curves 40 and 41 is representative of the force which is furnished by the leaf springs 8a and 8b and which is opposed by the force exerted by the diaphragm spring 4 upon the pressure plate 3. The point 42 on the curve 41 of FIG. 7 is indicative of the force furnished by the diaphragm spring 4 when the wear upon the friction linings 10a is negligible or nil and the clutch 1 is engaged, i.e., when the magnitude of the force being exerted by the spring 4 upon the pressure plate 3 assumes a maximum value. The point 42 can be shifted along the curve 41 (upwardly or downwardly) by changing the conicity of the main portion 11 of the spring 4 at the time of installing this spring in the friction clutch 1.

The curve 43 in the coordinate system of FIG. 7 denotes the expanding force furnished by the resilient pads 10b of the clutch disc 10 and tending to move the two sets of friction linings 10a axially and away from each other. The curve 43 is further indicative of the forces exerted by all other resilient parts which act simultaneously with the resilient pads 10b; such additional forces are attributable to the elasticity (if any) of the housing 2, the resiliency (if any) of the friction linings 10a and possibly others. Such axial spreading forces oppose the axial force which the diaphragm spring 4 exerts upon the pressure plate 3.

The distance 44 in the coordinate system of FIG. 7 is indicative of the extent of axial expansion of the resilient pads 10b during disengagement of the clutch 1, i.e., the pads 10b assist the leaf springs 8a, 8b in moving the pressure plate 3 axially of and away from the counterpressure plate 9 through the distance 44. It will be seen that the pads 10b render it possible to reduce the disengaging force which must be furnished by the leaf springs 8a and 8b.

At the point 45 of the curve 41, the pressure plate 3 begins to move away from and is no longer in physical contact with the adjacent set of friction linings 10a. Owing to the degressive characteristic of the curve 40 at such point, the magnitude of the required disengaging force (i.e., of the force which is necessary to move the pressure plate further away from the adjacent set of friction linings 10a) is well below that which would be required (starting at the point 42) in the absence of the resilient pads 10b.

When the point 45 is reached and the disengagement of the clutch 1 (i.e., the movement of the pressure plate 3 away from the clutch disc 10) continues, the magnitude of the force being applied by the spring 4 continues to decrease to the pont 46 of the curve 41. From there on, the force being applied by the spring 4 begins to increase. However, it is also possible to resort to undertakings (such as the utilization of one or more servo springs) which render it possible to prevent or to reduce the rate of an increase or rise of the required disengaging force beyond the point 46 on the curve 41 in the coordinate system of FIG. 7. Reference may be had to the aforementioned published German patent application Serial No. 195 10 905.

Figure 8:
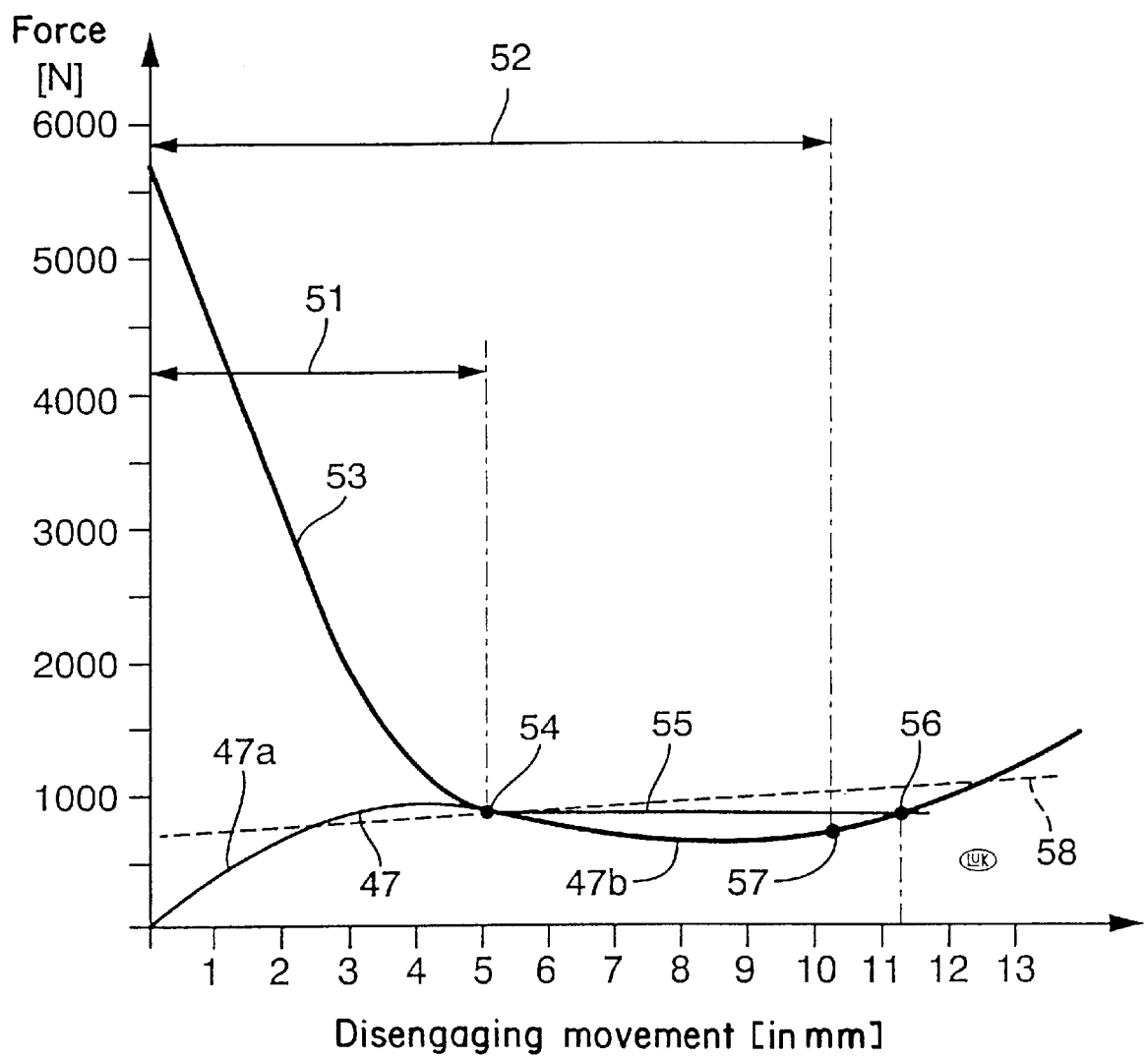
FIG. 8 illustrates a coordinate system wherein the curves denote various forces and the distances covered by various parts during disengagement of the friction clutch.

FIG. 8 shows a coordinate system wherein the curve 47 denotes the variations of the clutch disengaging force which must be applied to the free ends 4c of the tongues 12 forming part of the diaphragm spring 4. The distance (in mm) which must be covered by the free ends 4c in the direction of the arrow II must exceed the distance to be covered by that part of the major portion 11 of the diaphragm spring 4 which abuts the projections 3a of the pressure plate 3. This is due to the ratio of the radial distance of a free end 4c from the seat 5 to the radial distance of the seat 5 from the projections 3a. The just discussed ratio is or can be within the range of between about 3:1 and 5:1. The progress of magnitude of the disengaging force, with reference to the diameter of that portion of the release bearing 21 which engages and displaces the free ends 4c of the tongues 12, is related to the ratio of radial distance from 4c to 5 to radial distance from 5 to 3a. This can be appreciated by looking at the curve 41 in the coordinate system depicted in FIG. 7.

FIG. 7 further shows the distance 48 covered by the pressure plate 3 in a direction axially of the clutch and away from the adjacent set of friction linings 10a. The end of the distance 48 coincides with the end of the overall distance 50 covered by the pressure plate 3 between the axial position during full engagement of the clutch 1 and the axial position at a maximum distance from the counterpressure plate 9 (i.e., nearest to the cover 2a of the housing 2). The distance 48 and/or 50 normally is (or can be) selected in such a way that the disengaging force at the point 49 of the curve 41 is less than the disengaging force at the point 45.

Referring again to FIG. 6, the points 28a, 29a, 32a on the respective curves 28, 29, 32 denote the forces and sums of forces which are being applied by the leaf springs 8a, 8b and by the prongs 13 (in the engaged condition of a new clutch 1) upon the diaphragm spring 4, i.e., at a time when the wear upon the friction linings 10a is minimal or nil. On the other hand, the points 28b, 29b, 32b denote (on the curves 28, 29, 32 of FIG. 6) those forces and that sum of forces which are exerted by the leaf springs 8a, 8b and by the prongs 13 upon the pressure plate 3 when the clutch 1 is disengaged and while the clutch and its diaphragm spring 4 are still new (devoid of wear). The points 28c, 29c, 32c denote in FIG. 6 those forces and that sum of forces which are exerted by the leaf springs 8a, 8b and by the prongs 13 upon the pressure plate 3 when the clutch 1 has undergone a maximum amount of wear. The practically horizontal stretch 33 of the resultant curve 32 in FIG. 6 indicates that the magnitude of the sum of axial forces acting upon the diaphragm spring 4 remains at least substantially unchanged during the entire useful life of the clutch 1.

In the clutch 1 including the structure shown in FIGS. 1 to 5, the leaf springs 8a, 8b and the prongs 13 act as a composite force sensor which cooperates with the automatic wear compensating unit 7 to ensure that axial adjustments of the seat 5 and of the diaphragm spring 4 away from the cover 2a of the housing 2 are carried out when necessary to compensate for wear, at least upon the friction linings 10a, during the entire useful life of the power plant embodying such clutch.

As already mentioned hereinbefore, each disengagement of the clutch 1 is initiated by the release bearing 21 and is being carried out while the pressure plate 3 is caused (by the leaf springs 8a, 8b) and permitted (by the diaphragm spring 4) to move axially and away from the counterpressure plate 9. The means for moving the release bearing 21 is or can be of conventional design. Reference may be had, for example, to commonly owned U.S. Pat. No. 5,632,706 granted May 27, 1997 to Kremmling et al. for "MOTOR VEHICLE WITH ELECTRONIC CLUTCH MANAGEMENT SYSTEM".

Variations of the magnitude of the disengaging force which must be applied by the release bearing 21 to the free ends 4c of the tongues 12 are denoted by the curve 47 in the coordinate system of FIG. 8. This Figure further shows that, during an initial part 51 of the preset overall clutch disengagement distance 52, the disengaging force increases in a manner as represented by the portion 47a of the curve 47. At such time, the diaphragm spring 4 is being acted upon by a resultant axial force which urges the diaphragm spring 4 axially toward the cover 2a of the housing 2. Such resultant force is furnished by the resilient pads 10b as well as by the leaf springs 8a, 8b. The curve 53 of FIG. 8 denotes the force which prevails between the pressure plate 3 and the diaphragm spring 4. The point 54 of intersection between the curves 47 and 53 denotes the condition of the clutch 1 when the pressure plate 3 exerts no force or exerts a minimal force upon the adjacent set of friction linings 10a.

When the point 54 is exceeded (in a direction toward disengagement of the clutch 1), the disengaging force progresses in accordance with the portion 47b of the curve 47 in the coordinate system of FIG. 8. At such time, the resilient pads 10b of the clutch disc 10 no longer influence the movement of the pressure plate 3 further away from the counterpressure plate 9, i.e., the diaphragm spring 4 is then biased solely by the leaf springs 8a, 8b and by the prongs 13 which react against the heads 19 of the rivets 19a. The resultant force (furnished by the leaf springs 8a, 8b and by the prongs 13) urges the diaphragm spring 4 against the seat 5, i.e., indirectly against the cover 2a of the housing 2. This is denoted by the portion 33 of the curve 32 shown in FIG. 6. The resultant force denoted by the curve 32 is effective at least within the distance range 55 shown in FIG. 8. The latter Figure shows that, when the point 54 of the curve 47 is exceeded, the characteristic curve of the diaphragm spring 4 has a downward progress, i.e., the clutch disengaging force is within a selected range all the way to the point 56, less than the supporting force acting upon the diaphragm spring 4 to urge the latter against the seat 5 (see the curve 55). This ensures that the diaphragm spring 4 bears axially upon the seat 5, i.e., that this spring is propped by the cover 2a of the housing 2. The common point 54 of the curves 47, 53 shown in FIG. 8 corresponds to the point 45 on the curve 41 shown in FIG. 7. Furthermore, the point 57 on the curve 47 shown in FIG. 8 corresponds to the point 49 on the curve 41 of FIG. 7.

FIG. 8 further shows that the mode of operation of the friction clutch 1 is selected in such a way that the point 57 on the curve 47 (this point is reached when the pressure plate 3 has completed its movement away from the counterpressure plate 9 through the full distance 52) is spaced apart from the point 56 of intersection of the curve 55 and the curve section 47b; this ensures that, when the distance 52 is exceeded by a distance corresponding to that between the points 57 and 56, the wear compensating unit 7 cannot carry out an undesired (i.e., unnecessary or unwarranted) compensation for (nonexistent) wear or additional wear upon the friction linings 10a. Such adjustment can take place only when the axial bias of the coil spring or springs 20 in a direction to turn the seat 5 relative to the cover 2a and to thus move the seat 5 and the diaphragm spring 4 axially and away from the cover 2a to an extent which is necessary to compensate for initial or additional wear upon the friction linings 10a can overcome the resistance of the seat 5 to such angular movement about the axis X—X.

It will be seen that the release bearing 21 is caused to act upon the free ends 4c of the tongues 12 in such a way that the point 56 on the curve 47 shown in FIG. 8 is not exceeded. In order to prevent the development of such undesirable situation, it is possible (and often desirable) to provide a stop which limits the extent of axial movement and/or tilting (change of conicity) of the diaphragm spring 4.

The preceding discussion refers to the operation of the friction clutch 1 while the diaphragm spring 4 is maintained in a predetermined axial position relative to the cover 2a, namely before the friction linings 10a have undergone any wear or a wear above a predetermined minimum wear. However, once the wear upon the friction linings 10a (and hence normally also upon certain other constituents of the clutch 1, such as the plates 3, 9 and the spring 4) reaches the minimum value, the pressure plate 3 moves to a greater extent axially toward the counterpressure plate 9 (owing to the reduced combined thickness of the resilient pads 10b and friction linings 10a); this results in a change of conicity and in a reduced bias of the diaphragm spring 4 upon the pressure plate 3 and the seat 5. The point 42 on the curve 41 of FIG. 7 is caused to migrate toward the point 42', and the point 45 is caused to migrate toward the point 45'. This destroys the theretofore existing balance or equilibrium of forces (see the point 45) in the engaged condition of the clutch 1. The change of bias exerted by the diaphragm spring 4 upon the pressure plate 3 when the wear upon the friction linings 10a reaches a predetermined value entails a shifting of the progress of the clutch disengaging force, namely the required clutch disengaging force increases. Such increase of the disengaging force is taken up by the resultant force furnished by the leaf springs 8a, 8b and by the prongs 13 while the disengagement of the clutch progresses; consequently, the conicity of the diaphragm spring changes. This, in turn, causes the spring 4 to cover a certain axial distance in the region of contact with the seat 5, and such axial distance corresponds to the extent of wear upon the friction linings 10a. At such time, the main portion 11 of the spring 4 continues to bear upon the projections 3a of the pressure plate 3. Owing to the just described change of conicity of the spring 4 (and hence the resultant reduction of axial bias of (i.e., the amount of energy stored by) this spring), the amount of torque stored by the spring also changes with attendant reduction of the magnitude of the force which the spring 4 exerts upon the pressure plate 3. Such changes of the condition of the spring 4 can be seen by referring to the coordinate system of FIG. 7.

The magnitude of the force exerted by the diaphragm spring 4 continues to decrease until the force being exerted upon the pressure plate 3 (primarily by the spring 4 but also by the spring or springs 20 of the wear compensating unit 7) is balanced by the opposing force which is furnished by the leaf springs 8a, 8b and by the prongs 13. With reference to FIG. 7, this means that the points 42' and 45' respectively migrate back toward the points 42 and 45. Once the state of equilibrium is reestablished, the diaphragm spring 4 can be tilted (i.e., its conicity can be changed) relative to the seat 5 and the pressure plate 3 again moves away from contact with the adjacent set of friction linings 10a.

During such compensation for wear (at least) upon the friction linings 10a, the part 6 of the seat 5 is being turned by the prestressed coil spring or springs 20 of the wear compensating unit 7 to move axially and away from the cover 2a to an extent which is necessary to compensate for wear. Once the adjustment of the axial positions of the seat 5 and diaphragm spring 4 (in a direction axially of and away from the cover 2a) is completed, the next following disengagements of the clutch 1 are again carried out in a manner as described hereinbefore with reference to the curve 47 in the coordinate system of FIG. 8.

In actual practice, the just described compensations for wear take place frequently and by minute increments. In other words, the changes of distances and forces are minute in comparison with those shown, for the sake of clarity, greatly exaggerated in the coordinate systems of FIGS. 6 to 8.

It is advisable to avoid an unnecessary (i.e., undesirable) "compensation for wear" in response to greater than necessary displacement of the pressure plate 3 during disengagement of the clutch 1. This can be accomplished by increasing the axial force(s) acting upon the diaphragm spring 4 in a direction toward the cover 2a of the housing 2. The clutch 1 can be constructed and assembled in such a way that no unnecessary "compensation for wear" can take place, even when the extent of axial displacement proceeds beyond the point 56 on the curve 47 shown in FIG. 8. One presently preferred simple and reliable mode of preventing unwanted compensation for (non-existent) wear upon the friction linings 10a can be achieved by means of the prongs 13. Thus, it is merely necessary to ensure that the axial stressing of the prongs 13 increases during disengagement of the clutch 1. This can be achieved by ensuring that the diameter of the circle defined by the annulus of loci of contact between the convex surfaces 18a (reference should be had again to FIG. 1) and the heads 19 of the rivets 19a is smaller than the diameter of that annular portion of the seat 5 which serves as a fulcrum for the main portion 11 of the diaphragm spring 4.

The magnitude of the axial force being applied to the spring 4 can be increased by the leaf springs 8a, 8b (see the curve 29 in the coordinate system of FIG. 6). Thus, as the extent of axial movement of the pressure plate 3 toward the counterpressure plate 9 increases, the axial forces exerted by the leaf springs 8a, 8b increase. The progress of increased forces is represented in FIG. 8 by the broken line 58; this line denotes a composite force generated by the leaf springs 8a, 8b jointly with the prongs 13.

Since the leaf springs 8a, 8b are or can be called upon to furnish a substantial part of the supporting force for the diaphragm spring 4, it is often desirable to ensure that these leaf springs are immune to adverse (undesirable) effects of temperature changes. This can be accomplished, for example, by installing suitable thermal insulators between the pressure plate 3 and those end portions (22 or 23) of the leaf springs 8a, 8b which are riveted or otherwise affixed to the pressure plate. The thermal insulators can include washers or other forms of heat barriers and can be made, for example, of a suitable heat-resistant metallic or plastic material. A satisfactory metallic thermal insulator can be made of austenitic steel having a relatively high nickel or chromium content. It is further desirable and advantageous to subject the leaf springs 8a, 8b to a thermosetting treatment, e.g., within the friction clutch. Still further, it is advisable to install the leaf springs 8a, 8b in a portion of the clutch 1 which is located in the path of circulating atmospheric air.

FIG. 2 shows that the wear compensating unit 7 of the friction clutch 1 actually depicted in FIGS. 1 to 5 can comprise at least one coil spring 20 (or another suitable energy storing device). The spring (or springs) 20 is (are) optional because the seat 5 can be caused to turn relative to the cover 2a as a result of angular acceleration by the engine and/or the inertia of the part 6. Thus, angular acceleration of the rotary output element 9a (see FIG. 1) of the engine results in the development of a force which suffices to ensure that the part 6 of the seat 5 turns relative to the cover 2a as soon as the axial stressing of the part 6 decreases to a certain value which is indicative of a certain amount of initial or additional wear upon the friction linings 10a. Once the part 6 begins to turn relative to the housing 2, the aforementioned complementary ramps at the confronting sides of the part 6 and the cover 2a cause the seat 5 and the diaphragm spring 4 to move axially toward the axially fixed counterpressure plate 9, i.e., to compensate for wear upon the friction linings 10a.

In order to ensure that angular acceleration of the engine cannot result in a rotation of the part 6 relative to the housing 2 in a direction to move the seat 5 nearer to the cover 2a, the inner side of the cover 2a and the adjacent side of the part 6 of the seat 5 can be provided with annuli of sawteeth or analogous projections which confine the parts 2a, 6 to relative rotation in a single direction, i.e., in a direction enabling the part 6 and the diaphragm spring 4 to move axially and away from the cover 2a.

It is further advisable that the aforementioned sawteeth and/or their functional equivalents on the part 6 remain in permanent mesh with the complementary projections at the inner side of the cover 2a, i.e., that the part 6 be subjected to the action of a force which can be relatively small but suffices to urge the seat 5 against the cover 2a. For example, the friction clutch 1 can comprise a relatively soft (weak) spring (not specifically shown) which biases the part 6 against the adjacent inner side of the cover 2a. The spring can be installed to push or to pull the part 6 against the cover 2a.

In accordance with one presently preferred embodiment, the just discussed spring which urges the part 6 of the seat 5 against the cover 2a can form an integral part of the seat 5, for example, at least one elongated resilient arm or tine which is formed in a stamping or another suitable machine during the making of the part 6. Alternatively, or in addition to such spring or springs which is or which are of one piece with the seat 5, the entire part 6 can constitute a resilient element, e.g., by providing this part with an annulus of corrugations.

The resilient pads 10b can be omitted or replaced with other types of means for yieldably biasing the two sets of friction linings 10a axially of the clutch 1 and away from each other. The primary purpose of the resilient pads 10b or of their functional equivalents is to assist the release bearing 21 and the leaf springs 8a, 8b in moving the pressure plate 3 axially and away from the counterpressure plate 9 during the initial stage of disengagement of the clutch. It will be recalled that, in the illustrated clutch 1, the bias of the diaphragm spring 4 upon the pressure plate 3 during the initial stage of disengagement of the clutch exhibits a degressive characteristic. As concerns the advantages of the pads 10b and of their functional equivalents, reference should be had again to the patents and patent applications which are incorporated by reference, for example, to the published German patent application Serial No. 42 39 289.

An important advantage of the clutch 1 is that the magnitudes of the forces which are generated by the prongs 13 and by the leaf springs 8a, 8b on the one hand, and by the diaphragm spring 4 on the other hand, and act upon the pressure plate 3 in opposite directions, are related to each other in such a way that, when the clutch is properly assembled, the retaining force of the diaphragm spring (in the absence of wear upon the friction linings 10a) is greater than the force which is required to change the conicity of this spring. However, when the friction linings 10a have undergone a certain amount of (initial or additional) wear, i.e., when the conicity of the spring 4 in the engaged condition of the clutch has undergone a predetermined change, the forces urging the spring 4 against the seat 5 are reduced so that this spring and the seat can be moved axially and away from the cover 2a. The forces which are generated by the leaf springs 8a, 8b to act upon the pressure plate 3 and which are superimposed upon the forces generated by the prongs 13 must be taken into consideration in selecting the forces which are generated by the prongs 13.

It is further advisable to select the variations of cross-sections and of the moments of resistance against bending of successive increments of the prongs 13 (as viewed in a direction radially inwardly from the annular main portion 11 of the spring 4 toward the axis X—X) in such a way that one achieves an at least substantially constant (uniform) elastic deformation (i.e., at least substantially uniform bending stresses upon) the prongs 13 all the way from the main portion 11 to the respective webs 15.

The distribution of the tongues 12 and prongs 13 (as seen in the circumferential direction of the spring 4) can but need not be uniform. FIG. 3 shows that certain pairs of neighboring prongs 13 are separated from each other by a single tongue 12, and that certain other neighboring prongs are separated from each other by a pair of tongues. Other combinations or distributions of tongues 12 and prongs 13 are equally within the purview of the present invention; for example, neighboring prongs 13 can be separated by individual (single) tongues 12 or by groups of two, three or four tongues 12 or vice versa. Groups of three neighboring prongs are preferred in many instances.

Each diaphragm spring 4 can constitute a converted circular or polygonal blank which is provided with radially and/or otherwise distributed and/or oriented slots and/or other cutouts (such as the openings or windows 4a and the central opening) to provide the thus converted blank with requisite numbers of suitably distributed tongues 12 and prongs 13. Radially extending slots can be provided between neighboring tongues 12 and/or prongs 13, as well as within individual prongs or tongues (FIG. 3 shows slots between the arms or legs 14, 16 of each of the prongs 13). In other words, neighboring prongs and/or tongues need not be separated from each other by mere cuts or slits but can be spaced apart from each other by pronounced slots. The same applies for the mutual spacings of the arms or legs of individual prongs 13.

The counterpressure plate 9 can be mounted directly on the output element 9a of the engine or another prime mover, i.e., the composite flywheel 9b constitutes an optional element of the power train which includes the friction clutch 1 of FIGS. 1 and 2. The same holds true for the torsional vibration damper 10e of the clutch disc or clutch plate 10.

Still further, the counterpressure plate 9 and/or the pressure plate 3 and/or the housing 2 can be provided with suitable bores, holes and/or channels to prevent overheating of the leaf springs 8a, 8b.

FIGS. 9 to 12 illustrate certain details of a modified connection between a clutch housing 102 and an axially movable pressure plate 103. The connection comprises a first set of leaf springs 108 and a second set of leaf springs 126 which are different from the leaf springs 108. The leaf springs 126 extend substantially tangentially (i.e., circumferentially) of the pressure plate 103 and serve to transmit torque from the housing 102 to the pressure plate; these leaf springs are or can be installed in such a way that they are stressed in the direction of the common axis of the parts 102, 103 in a sense to ensure that they urge the pressure plate toward the housing at least during one or more selected stages of disengagement of the clutch 101 which employs the structure of FIGS. 9 to 12. The axial prestressing of the leaf springs 126 must be taken into consideration during the designing and assembly of the clutch 101 because such prestressing influences the mode of operation of the automatic wear compensating unit (e.g., a unit corresponding to the unit 7) which is built into the clutch.

The leaf springs 108 of the other set are installed in the clutch 101 in such a way that, when the clutch is engaged, the leaf springs 108 urge the pressure plate 103 axially toward the housing 102, i.e., these leaf springs perform the function of the leaf springs 8a, 8b in the friction clutch 1 of FIGS. 1 and 2. The two end portions 127 of each leaf spring 108 are affixed (e.g., riveted) to the housing 102, and a median portion 128 of each of these leaf springs is riveted or otherwise affixed to the pressure plate 103. The rivets which serve to secure the end portions 127 of the leaf springs 108 to the housing 102 act as distancing elements (see FIG. 10). The fasteners (e.g., rivets or bolts) 141 which secure the median portions 128 of the leaf springs 108 to the pressure plate 103 have end portions anchored in radially outwardly extending arms 142 of the pressure plate.

It is possible to replace each discrete leaf spring 108 and/or 126 with a package or stack of two or more superimposed leaf springs.

The leaf springs 108 are configured and installed in prestressed condition in such a way that (a) they urge the pressure plate 103 axially toward the housing 102 during disengagement of the clutch 101, and (b) they transmit a progressively increasing force at least during disengagement of the clutch. In other words, the bias of the leaf springs 108 upon the pressure plate 103 (in a direction to urge the pressure plate axially toward the housing 102) increases during one or more stages but preferably during each stage of disengagement of the clutch 101.

The leaf springs 126 are also mounted in the clutch 101 in an axially stressed condition. The initial stress is such than the force with which the pressure plate 103 is urged axially of and toward the housing 102 decreases during disengagement of the clutch 101.

Figure 9:
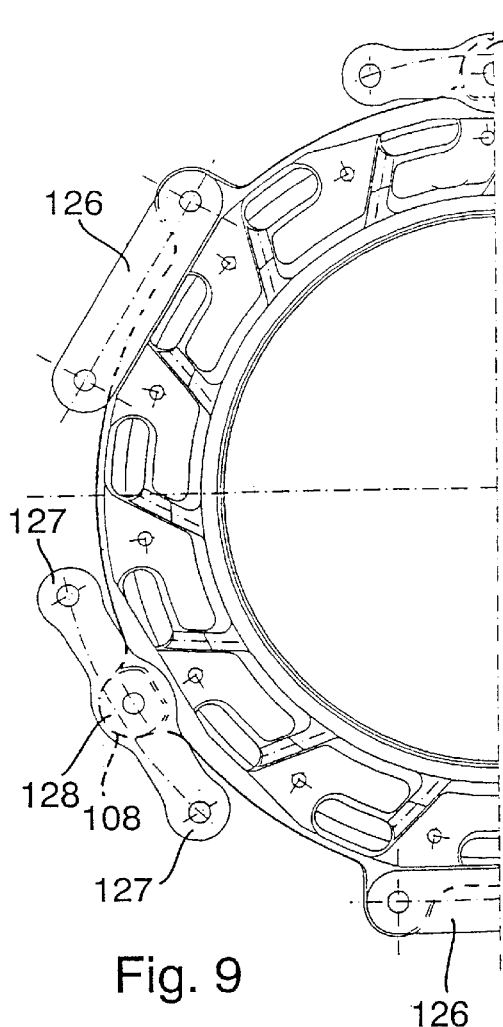
FIG. 9 is a fragmentary elevational view similar to that of FIG. 3 but showing a portion of a modified pressure plate and modified leaf springs.
Figure 11:
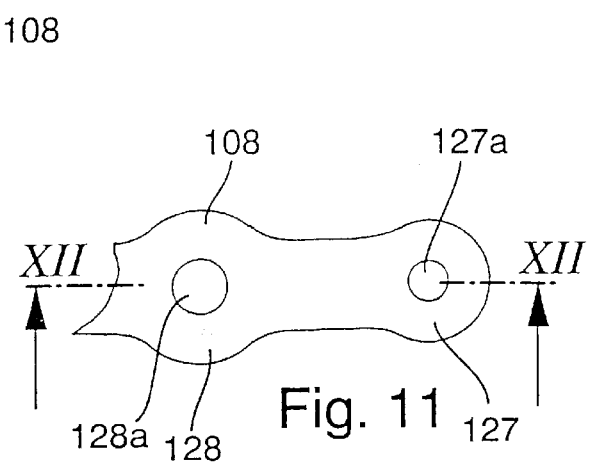
FIG. 11 is an enlarged fragmentary plan view of one of the leaf springs shown in FIG. 9.
Figure 12:
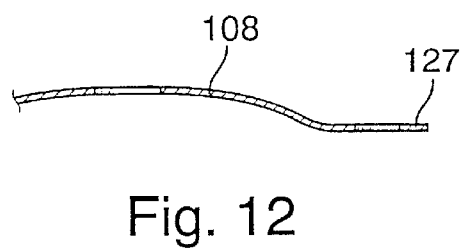
FIG. 12 is a sectional view as seen in the direction of arrows from the line XII—XII in FIG. 11.
Figure 10:
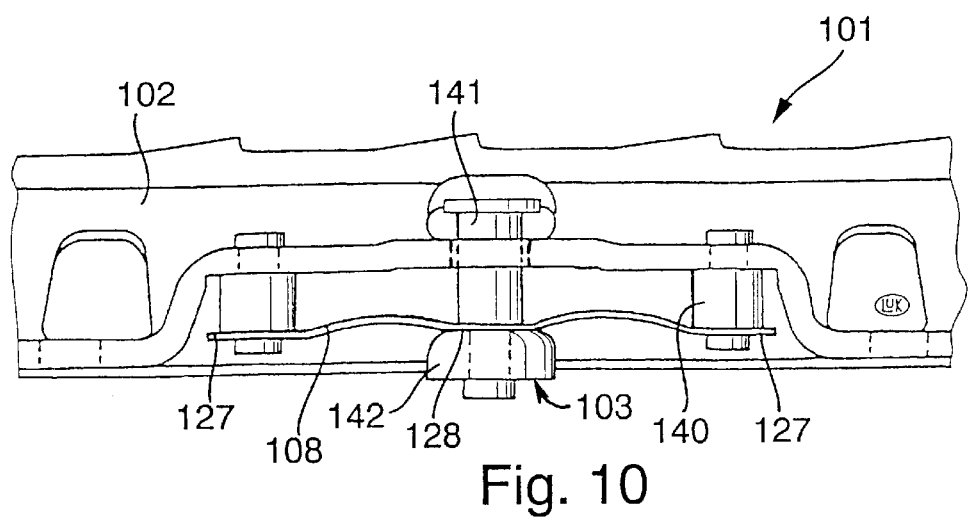
FIG. 10 is an enlarged fragmentary end elevational view of the structure shown in FIG. 9.

As can be seen in FIGS. 10 and 12, the leaf springs 108 consist of a relatively thin or very thin metallic sheet stock, and this also applies for the leaf springs 126. For example, the leaf springs 126 and/or 108 can (but need not always) be made of sheet metal having a thickness in the range of between about 0.2 and 0.8 mm. A presently preferred material is sheet steel. It is often preferred to cut the leaf springs 108 and/or 126 from plate-like or strip-shaped blanks in a suitable stamping machine which imparts to each leaf spring a desired outline (see FIGS. 9 and 11) and which can further serve to simultaneously shape (such as bend and/or crease and/or facet) the leaf spring, e.g., in a manner as shown in FIG. 12 for one of the leaf springs 108.

As shown in FIGS. 9 and 11, each leaf spring 108 is elongated and can be provided with two enlarged.(such as rounded) end portions 127 having openings 127a for the shanks of the respective rivets 140, and with an enlarged (such as rounded) median portion 128 having an opening 128a for the shank of the respective fastener 141. FIG. 12 shows that, when not installed in the clutch 101 (i.e., prior to stressing), each leaf spring 108 can include one or more rounded portions and/or one or more flat facets joined to each other at transversely extending ridges. The purpose of such and/or other pre-shaping of the leaf springs, e.g., at least of the leaf springs 108, is to ensure that the clutch 101 and/or its constituents exhibits or exhibit the desired force-to-distance characteristics.

As can be seen by comparing the leaf spring 108 of FIG. 12 with that which is shown in FIG. 10, each such leaf spring is deformed (at least in the engaged condition of the clutch 101) in several directions as soon as it is properly coupled to the pressure plate 103 and to the housing 102. Thus, each leaf spring 108 is stressed axially of the clutch 101 and each such leaf spring is also upset, i.e., its shape as shown in FIG. 12 (prior to connection to the parts 102, 103) departs from that when its end portions 127 are riveted to the housing 102 and its median portion 128 is riveted to an arm 142 of the pressure plate 103. Such mounting ensures that each properly installed leaf spring 108 can transmit or apply requisite forces to the pressure plate 103. As shown in FIG. 10, each properly installed leaf spring 108 includes an arcuate (concavo-convex) portion between the median portion 128 and one of the end portions 127 as well as an identical or similar arcuate portion between the median portion 128 and the other end portion 127. By properly selecting the distances between each (e.g., centrally located) fastener 141 and the respective fasteners 140 and/or by properly selecting the shapes of the leaf springs 108, one can select the exact magnitude of stresses of these leaf springs in the axial and/or in the circumferential direction of the pressure plate 103 as well as the distance between each pair of rivets 140 which are employed to secure the end portions 127 of a leaf spring 108 to the adjacent portions of the housing 102.

It is further possible to replace the leaf springs 126 of FIG. 9 with leaf springs which perform functions corresponding (either entirely or in part) to those of the prongs 13 shown in FIGS. 1 to 3. Under such circumstances, the friction clutch 101 can employ a standard diaphragm spring (e.g., a diaphragm spring corresponding to that shown at 4 but without the prongs 13).

Figure 13:
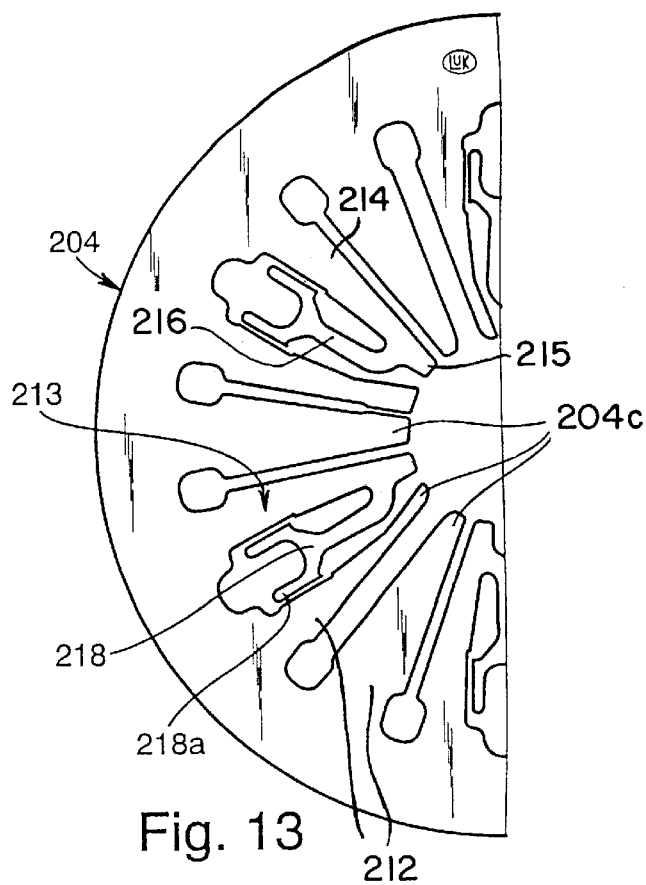
FIG. 13 is a fragmentary elevational view similar to that of FIG. 3 but showing a modified diaphragm spring.

FIGS. 13 and 14 respectively show diaphragm springs 204, 304 which constitute modifications of the diaphragm spring 4 shown in FIGS. 1 to 3 and each of which can be put to use in lieu of the spring 4.

A difference between the leaf springs 4 and 204 is that the latter has different prongs 213. Each prong 213 has two radially extending legs or arms 214, 216 and a web 215. The Y-shaped free end 218 of each leg 216 has two radially outwardly extending tines 218a which engage the adjacent side of the respective rivet head 19 if the diaphragm spring 204 is installed in the clutch 1 in lieu of the diaphragm spring 4. The shank of a rivet 19a can be received in the recess between the respective tines 218a so that the free ends 218 of the diaphragm spring 204 can cooperate with the rivets 19a to prevent the parts 2 and 204 from turning relative to each other about the axis of the spring 204.

Referring again to FIGS. 1 and 2, the free ends 18 of the prongs 13 on the diaphragm spring 4 can be distributed in such a way that one or more of these free ends engages or engage the respective head(s) 19 at one side of the respective rivet(s) and that the remaining free end or free ends engages or engage the respective head(s) 19 at the other side(s) of the respective rivet(s) 19a. Thus, the clutch 1 can also embody means for preventing angular movements of the housing 2 and the diaphragm spring 4 relative to each other.

FIG. 13 further shows that the radial distance of the webs 215 of the prongs 213 from the axis of the diaphragm spring 204 is the same as that of the free ends 204c of the tongues 212. Thus, the prongs 213 can form part of the means for disengaging the clutch which employs the diaphragm spring 204 of FIG. 13.

The diaphragm spring 304 of FIG. 14 differs from the diaphragm spring 204 primarily in that the prongs 313 are shorter than the tongues 312, i.e., the webs 315 of the prongs 313 are located radially outwardly of the free ends 304c of the tongues 312 so that the prongs 313 cannot or need not participate in disengagement of the clutch employing the diaphragm spring 304 of FIG. 14.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of friction clutches for use in the prime movers of motor vehicles and, therefore, such adaptations should and are intended to be comprehended within the meaning and range of equivalence of the appended claims.

What is claimed is:

1. A repeatedly engageable and disengageable friction clutch, comprising:
    a housing rotatable about a predetermined axis and including a plurality of retainers;
    a rotary clutch disc coaxial with and spaced apart from said housing and being subject to wear in response to repeated engagement of the clutch;
    a pressure plate coaxial with and disposed between said clutch disc and said housing and being rotatable with and movable within limits axially of said housing;
    at least one diaphragm spring comprising a main portion and disposed between said housing and said pressure plate and having a side confronting said pressure plate, said diaphragm spring being arranged to bias said pressure plate against said clutch disc in the engaged condition of the clutch; and
    means for automatically compensating for said wear, including a seat pivotably mounting said at least one diaphragm spring and means for intermittently moving said at least one diaphragm spring axially of and away from said housing toward said clutch disc, said at least one diaphragm spring further having resilient means reacting against said housing and arranged to urge said at least one diaphragm spring against said seat, said resilient means comprising a plurality of prongs of one piece with said main portion of said at least one diaphragm spring and engaging said retainers of said housing at said side of said diaphragm spring, said at least one diaphragm spring further having passages through which said retainers extend from said housing toward said pressure plate.

2. The clutch of claim 1, further comprising means for rotating at least one of said housing and said pressure plate.

3. The clutch of claim 2, wherein said means for rotating forms part of a power train in a motor vehicle.

4. The clutch of claim 1, further comprising means for rotating one of said housing and said pressure plate in response to rotation of the other of said housing and said pressure plate.

5. The clutch of claim 1, wherein said at least one diaphragm spring is arranged to store energy in the engaged condition of the clutch and said means for intermittently moving includes means for maintaining the amount of energy stored by said at least one diaphragm spring in the engaged condition of the clutch at an at least substantially constant value.

6. The clutch of claim 1, wherein said housing includes a portion which is provided with said retainers and is engaged by said prongs, said side of said at least one diaphragm spring confronting said retainers.

7. The clutch of claim 1, wherein said housing further includes a cover and distancing elements affixed to said cover.

8. The clutch of claim 7, wherein said distancing elements include rivets having heads each engaged by at least one of said prongs, said passages being disposed between said cover and the respective heads as seen in the direction of said axis.

9. The clutch of claim 1, wherein said housing consists of a metallic sheet material and further includes a cover and a plurality of arms of one piece with said cover, each of said prongs bearing upon one of said arms.

10. The clutch of claim 9, wherein said at least one diaphragm spring has windows and said arms extend from said cover, through said windows and toward said pressure plate.

11. The clutch of claim 1, further comprising means for disengaging the clutch against the opposition of said resilient means.

12. The clutch of claim 1, wherein said at least one diaphragm spring has a characteristic curve which is a degressive curve during at least one predetermined stage of operation of the clutch.

13. The clutch of claim 1, wherein said at least one diaphragm spring further comprises an annular portion, said prongs forming part of and being surrounded by said annular portion.

14. The clutch of claim 13, wherein said annular portion is resilient and said prongs extend from said annular portion substantially radially of said axis.

15. The clutch of claim 14, wherein at least one of said prongs includes a first portion extending from said annular portion toward said axis, a second portion extending in a direction from said axis toward said annular portion, and an intermediate portion remote from said annular portion and connecting said first portion with said second portion.

16. The clutch of claim 1, wherein said resilient means of said at least one diaphragm spring comprises at least one at least substantially hairpin-shaped resilient element.

17. The clutch of claim 1, further comprising clutch disengaging means arranged to effect axial movements of said pressure plate away from said clutch disc, said at least one diaphragm spring further comprising an annular portion bearing upon said pressure plate at least in the engaged condition of the clutch and said prongs extending from said annular portion toward said axis, said at least one diaphragm spring further comprising tongues each extending from said annular portion toward said axis and at least one thereof being flanked by a pair of said prongs, said tongues forming part of said disengaging means.

18. The clutch of claim 1, wherein said at least one diaphragm spring constitutes a converted blank and further includes an annular portion bearing upon said pressure plate, said prongs being surrounded by said annular portion and, at least in part, by cutouts provided in the blank.

19. The clutch of claim 1, wherein said at least one diaphragm spring further comprises an annular portion bearing upon said pressure plate, said prongs being prestressed and being surrounded by said annular portion and bearing upon said housing.

20. The clutch of claim 19, wherein said prongs are resiliently deformable in the direction of said axis.

21. The clutch of claim 1, further comprising elastically deformable lifting members arranged to bias said pressure plate axially toward said housing with a variable force during disengagement of the clutch.

22. The clutch of claim 21, wherein said lifting members include springs attached to said pressure plate and to said housing.

23. The clutch of claim 21, wherein said lifting members are arranged to subject said pressure plate to the action of a force which varies in response to progressing wear upon said clutch disc and attendant movements of said pressure plate axially of and away from said housing during successive engagements of the clutch.

24. The clutch of claim 23, wherein said lifting members have a force applying characteristic which is degressive in response to said movements away from said housing.

25. The clutch of claim 1, further comprising a driven rotary counterpressure plate coaxial with said pressure plate, said clutch disc being disposed between said pressure plate and said counterpressure plate.

26. The clutch of claim 25, wherein said counter-pressure plate forms part of a flywheel.

27. The clutch of claim 1, further comprising leaf springs arranged to yieldably bias said pressure plate axially and away from said clutch disc.

28. The clutch of claim 27, wherein said leaf springs have undulate shapes and store energy in the direction of said axis, each of said leaf springs having at least one first portion affixed to said pressure plate and at least one second portion affixed to said housing.

29. The clutch of claim 28, wherein said leaf springs are elongated and are stressed lengthwise at least in the engaged condition of the clutch.

30. The clutch of claim 28, wherein said leaf springs are elongated and are bent lengthwise and thereby maintained in a stressed condition at least in the engaged condition of the clutch.

31. The clutch of claim 1, wherein said pressure plate is arranged to cover a predetermined distance in the direction of said axis and away from said clutch disc during each disengagement of the clutch, and further comprising resilient lifting members arranged to bias the pressure plate toward said housing with a progressively varying force at least during a portion of each compensation for wear upon said clutch disc.

32. The clutch of claim 1, further comprising leaf springs arranged to move said pressure plate toward said housing during each disengagement of the clutch in parallel with said resilient means of said at least one diaphragm spring.

33. The clutch of claim 32, wherein said leaf springs are arranged to urge said pressure plate away from said clutch disc with a force which decreases in the course of each disengagement of the clutch.

34. The clutch of claim 32, further comprising means for affixing each of said leaf springs to said pressure plate and to said housing.

35. The clutch of claim 32, wherein said leaf springs are in torque-transmitting engagement with said pressure plate and with said housing.

36. The clutch of claim 1, further comprising leaf springs arranged to transmit torque between said pressure plate and said housing.

37. The clutch of claim 1, further comprising leaf springs connecting said housing with said pressure plate, said leaf springs and said resilient means being arranged to subject said pressure plate to the action of a predetermined resultant force in a direction away from said clutch disc at least substantially independently of the extent of wear upon said clutch disc.

38. The clutch of claim 37, wherein said predetermined force is at least substantially constant.

39. The clutch of claim 37, wherein said predetermined force increases in response to progressing wear upon said clutch disc.

* * * * *

UNITED STATES PATENT AND TRADEMARK OFFICE
CERTIFICATE OF CORRECTION

PATENT NO. : 6,305,520 B1
DATED : October 23, 2001
INVENTOR(S) : Karl-Ludwig Kimmig and Michael Wachtel It is certified that error appears in the above-identified patent and that said Letters Patent is hereby corrected as shown below:

<u>Title page,</u>
Item [73], Assignee, change "LuK Lamellon und Kupplungsbau" to -- LuK Lamellen und Kupplungsbau --.

Signed and Sealed this

Nineteenth Day of March, 2002

Attest:

JAMES E. ROGAN
*Director of the United States Patent and Trademark Office*

*Attesting Officer*